US012614951B2

(12) United States Patent
Budhdeo

(10) Patent No.: US 12,614,951 B2
(45) Date of Patent: Apr. 28, 2026

(54) SOLAR TURBINE SYSTEM AND A METHOD THEREOF

(71) Applicant: ENTROPY ENGINES LIMITED, Hertfordshire (GB)

(72) Inventor: Shamir Pravinchandra Budhdeo, Pinner (GB)

(73) Assignee: ENTROPY ENGINES LIMITED, Hertfordshire (GB)

( * ) Notice: Subject to any disclaimer, the term of this patent is extended or adjusted under 35 U.S.C. 154(b) by 0 days.

(21) Appl. No.: 18/764,431

(22) Filed: Jul. 5, 2024

(65) Prior Publication Data

US 2025/0023424 A1    Jan. 16, 2025

(30) Foreign Application Priority Data

Jul. 11, 2023    (GB) ..................................... 2310645

(51) Int. Cl.
H02K 7/18        (2006.01)
F24S 90/00        (2018.01)

(52) U.S. Cl.
CPC .............. H02K 7/183 (2013.01); F24S 90/00 (2018.05)

(58) Field of Classification Search
CPC ................................. H02K 7/183; F24S 90/00
See application file for complete search history.

(56) References Cited

U.S. PATENT DOCUMENTS

| | | | | |
|---|---|---|---|---|
| 2005/0126170 A1* | 6/2005 | Litwin | .................... | F03G 6/071 |
| | | | | 60/641.8 |
| 2012/0167873 A1* | 7/2012 | Venetos | .................. | F03G 6/121 |
| | | | | 126/714 |
| 2024/0401573 A1* | 12/2024 | Budhdeo | ................... | F03G 6/04 |
| 2024/0408511 A1* | 12/2024 | budhdeo | .................. | F28B 5/00 |

FOREIGN PATENT DOCUMENTS

| | | | | |
|---|---|---|---|---|
| EP | 4474744 A1 * | 12/2024 | ............. | B01D 5/009 |

OTHER PUBLICATIONS

EPO rejection of EP 4 474 744 A1. (Year: 2024).*

* cited by examiner

*Primary Examiner* — Sean Gugger
(74) *Attorney, Agent, or Firm* — Jose Cherson Weissbrot

(57)    ABSTRACT

A solar turbine system that utilizes solar radiation energy to generate electricity. The system comprises an energy collecting module, high-pressure cylinder, an asymmetric bi-conical expansion chamber, a vector cancelling condenser, a condensation chamber. The energy collecting module consists of a transparent outer body, a transparent inner body separated by a vacuum, and a 3-dimensional metallic grid. The vector cancelling condenser includes gas outlets facing each other to cancel gas velocity and form saturated vapor, which condenses to fluid.

11 Claims, 1 Drawing Sheet

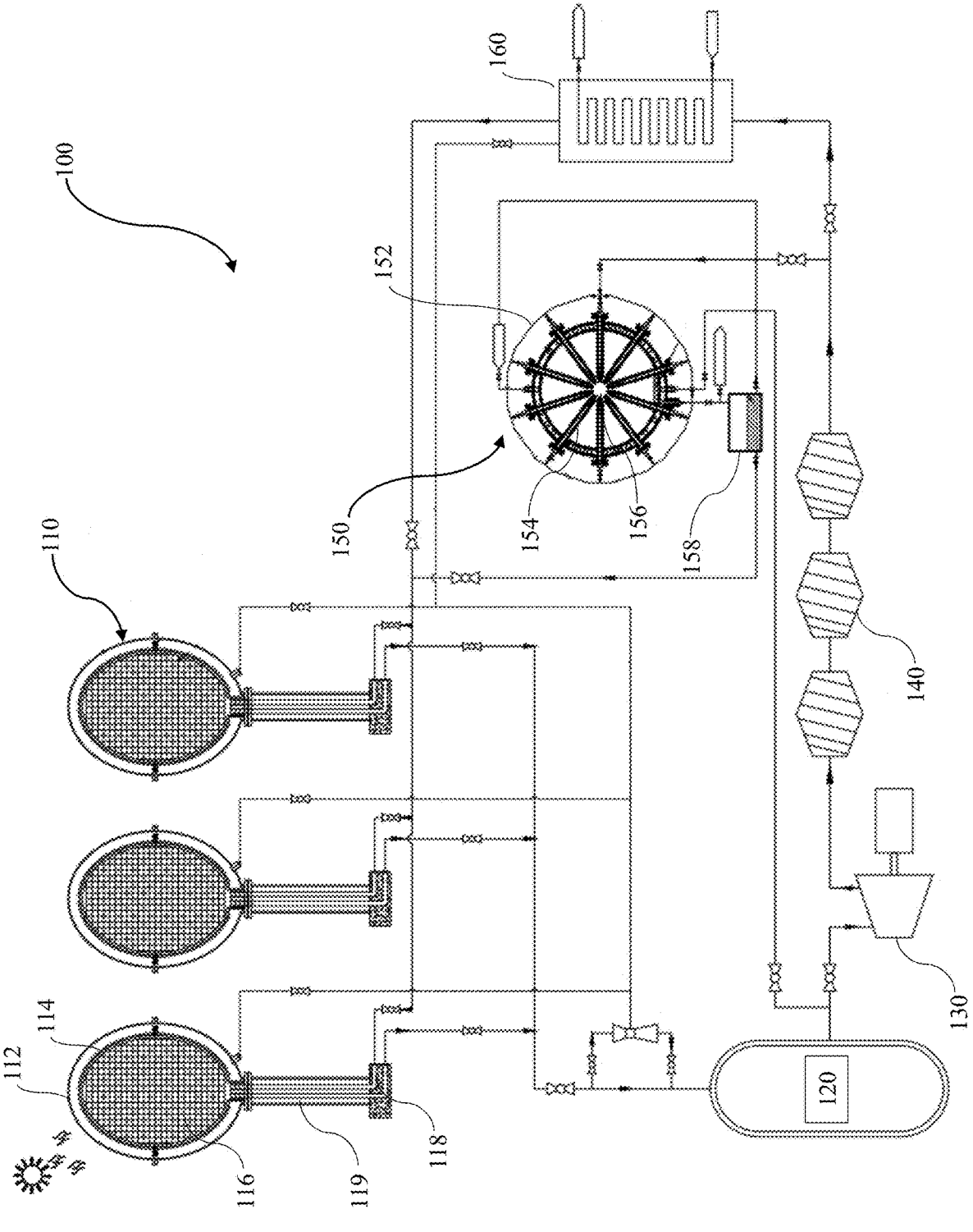

SOLAR TURBINE SYSTEM AND A METHOD THEREOF

FIELD OF THE INVENTION

The present invention relates to solar turbine systems, and more specifically, to a solar turbine system that utilizes phase change materials and incorporates various components to enhance efficiency and energy conversion.

BACKGROUND OF THE INVENTION

Solar energy is a renewable and abundant source of power. Various systems have been developed to harness solar energy for electricity generation. Solar turbine systems are one such approach, where solar radiation energy is collected and utilized to generate electricity through the expansion of a working fluid. However, existing solar turbine systems often suffer from low efficiency and limited energy storage capabilities. There is a need for an improved solar turbine system that maximizes energy conversion efficiency, enables energy storage, and enhances overall system performance.

Further, existing solar turbine systems suffer from various drawbacks, including inefficiency in energy collection, limited cooling capabilities, and incomplete condensation of the expanded gas.

Therefore, there is a need for an improved solar turbine system that overcomes the limitations of existing systems and provides enhanced energy collection, cooling, and condensation capabilities.

SUMMARY OF THE INVENTION

The present invention provides a solar turbine system that overcomes the limitations of the prior art. The system incorporates various components, including an energy collecting module, a high-pressure cylinder, a turbine, asymmetric bi-conical expansion chambers, a vector cancelling condenser, and a condensation chamber. These components work together to efficiently convert solar radiation energy into electricity and enable energy storage using phase change materials.

The present invention is directed to a solar turbine system that overcomes the limitations of existing systems. The system comprises several components, including an energy collecting module, a high-pressure cylinder, a turbine, asymmetric bi-conical expansion chambers, a vector cancelling condenser, and a condensation chamber. These components work together to efficiently convert solar radiation energy into electricity.

The energy collecting module receives solar radiation energy and utilizes it to convert a fluid of a phase change material into gas. The high-pressure cylinder is fluidically coupled with the energy collecting module and stores the gas at high pressure. The turbine, fluidically coupled with the high-pressure cylinder, generates electricity from the expansion of the gas. The asymmetric bi-conical expansion chambers are fluidically coupled with the turbine and cool the gas received from the turbine. The vector cancelling condenser is fluidically coupled with one asymmetric bi-conical chamber and partially condenses the gas into the fluid form of the phase change material, delivering it back to the energy collecting module. The condensation chamber is fluidically coupled with the vector cancelling condenser and further condenses un-condensed gas into fluid, delivering it to the energy collecting module.

In one embodiment, the energy collecting module includes a transparent outer body, a transparent inner body separated from the outer body by a vacuum, a 3-dimensional metallic grid placed inside the transparent inner body, an inlet pipe fluidically coupled with the vector cancelling condenser and condensation chamber, and an outlet pipe fluidically coupled with the high-pressure cylinder. The inlet pipe provides fluidized phase change material from the vector cancelling condenser and condensation chamber to the transparent inner body, while the outlet pipe delivers the pressurized gas of the phase change material from the transparent inner body to the high-pressure cylinder.

The vector cancelling condenser comprises a body defined by at least one wall and an enclosed space. It further includes at least one pair of delivery tubes with gas outlets facing each other. These delivery tubes cancel the velocity of gas coming out from the gas outlets, forming saturated vapor of the gas. The latent heat of condensation from the saturated vapors releases to form condensed fluid, which is stored in a fluid container fluidically coupled with the body. The fluid container is thermally insulated to reduce heat loss from the stored condensed fluid.

The solar turbine system may also include a control system to regulate the flow of the phase change material and gas based on temperature, pressure, and electricity generation requirements. Additionally, a backup energy storage system may be incorporated to store excess electricity generated by the turbine for use during periods of low solar radiation. The system may further comprise a monitoring system for collecting and analyzing performance data.

The phase change material used in the system can be selected from a group consisting of nitrogen, cryogenic liquids, refrigerants, paraffinn wax, fatty acids, and salts. The turbine is coupled to a generator for converting mechanical energy into electrical energy. The asymmetric bi-conical expansion chamber may include cooling fins or heat sinks to enhance heat dissipation from the gas. The inlet pipe of the energy collecting module may have a flow control valve to regulate the flow of the fluidized phase change material.

The invention also encompasses a method for operating the solar turbine system. The method involves receiving solar radiation energy, converting a phase change material into gas, storing the gas at high pressure, generating electricity by expanding the gas in a turbine, cooling the gas using asymmetric bi-conical expansion chambers, partially condensing the gas into the fluid form of the phase change material using a vector cancelling condenser, and further condensing un-condensed gas into fluid using a condensation chamber.

Furthermore, the invention encompasses a computer-readable medium containing instructions for controlling the solar turbine system, where the instructions include steps for receiving solar radiation energy, converting a phase change material into gas, storing the gas at high pressure, expanding the gas to generate electricity, cooling the gas, partially condensing the gas into fluid form, condensing un-condensed gas into fluid, and delivering the fluid to the energy collecting module.

In summary, the present invention provides a solar turbine system that efficiently converts solar radiation energy into electricity, enables energy storage using phase change materials, and incorporates various components to enhance system performance.

BRIEF DESCRIPTION OF THE DRAWINGS

To further clarify the above and other advantages and features of the present invention, a more particular description of the invention will be rendered by reference to specific embodiments thereof, which are illustrated in the accompanying drawings. It is appreciated that these drawings depict only typical embodiments of the invention and are therefore not to be considered limiting of its scope. The invention will be described and explained with additional specificity and detail through the use of the accompanying drawings, in which:

FIG. 1 is a schematic diagram illustrating the solar turbine system according to an embodiment of the present invention.

DETAILED DESCRIPTION OF THE INVENTION

The following detailed description of the invention refers to the accompanying drawings that illustrate specific embodiments in which the invention can be practiced. The embodiments are described in sufficient detail to enable those skilled in the art to practice the invention. It is to be understood that other embodiments may be utilized, and structural, functional, and procedural changes may be made without departing from the scope of the present invention.

FIG. 1 illustrates a solar turbine system 100 according to an embodiment of the present invention. The system 100 includes an energy collecting module 110, a high-pressure cylinder 120, a turbine 130, asymmetric bi-conical expansion chambers 140, a vector cancelling condenser 150, a condensation chamber 160, a control system (not shown in figure), a monitoring system (not shown in figure), a backup energy storage system (not shown in figure), and a generator (not shown in figure).

The energy collecting module 110 is configured to receive solar radiation energy and convert a phase change material into gas. The energy collecting module 110 includes a transparent outer body 112 and a transparent inner body 114 separated by a vacuum. A 3-dimensional metallic grid 116 is placed inside the transparent inner body 114. The energy collecting module 110 further comprises an inlet pipe 118 fluidically coupled with the vector cancelling condenser 150 and the condensation chamber 150 to provide fluidized phase change material to the transparent inner body 114. An outlet pipe 119 fluidically coupled with the high-pressure cylinder 120 delivers the pressurized gas of the phase change material from the transparent inner body 114 to the high-pressure cylinder 120.

The high-pressure cylinder 120 stores the gas at high pressure and supplies it to the turbine 130. The turbine 130 is coupled to the generator and generates electricity from the expansion of the gas received from the high-pressure cylinder 120. The asymmetric bi-conical expansion chambers 140 cool the gas from the turbine 130 and enhance heat dissipation using cooling fins or heat sinks. The vector cancelling condenser 150 partially condenses the gas into the fluid form of the phase change material and delivers the fluid back to the energy collecting module 110. The vector cancelling condenser 150 includes a body 152 defined by at least one wall and an enclosed space. The vector cancelling condenser 150 further comprises at least one pair of delivery tubes 154 with gas outlets 156 facing each other, canceling the velocity of gas to form saturated vapor. Latent heat of condensation is released from the saturated vapors, resulting in the formation of condensed fluid. The vector cancelling condenser 150 also includes a fluid container 158 for storing the condensed fluid. The fluid container 158 is thermally insulated to reduce heat loss. The fluid container 158 is fluidically coupled with the wall of the vector cancelling condenser, and with the condensation chamber 160 and the high pressure cylinder 120. The fluid container 158 configured to store the condensed fluid and recirculate a portion of the condensed fluid into the wall of the vector cancelling condenser to absorb the latent heat of the saturated vapours.

The condensation chamber 160 receives the un-condensed gas from the vector cancelling condenser 150 and further condenses it into fluid form. The fluid is then delivered to the energy collecting module 110. The control system regulates the flow of the phase change material and the gas within the system based on temperature, pressure, and electricity generation requirements. The monitoring system collects and analyzes performance data of the solar turbine system 100. The backup energy storage system stores excess electricity generated by the turbine 130 for use during periods of low solar radiation.

The phase change material used in the solar turbine system 100 can be selected from the group consisting of nitrogen, paraffin wax, fatty acids, and salts. The combination of these components and their interactions enable the efficient conversion of solar radiation energy into electricity, as well as the storage of excess energy.

The present invention also encompasses a method for operating the solar turbine system described above. The method includes the following steps:

a) Receiving solar radiation energy using the energy collecting module.

b) Converting a phase change material into gas using the solar radiation energy received in step (a).

c) Storing the gas at high pressure in the high-pressure cylinder fluidically coupled with the energy collecting module.

d) Generating electricity by expanding the gas received from the high-pressure cylinder in the turbine.

e) Cooling the gas received from the turbine using at least one asymmetric bi-conical expansion chamber fluidically coupled with the turbine.

f) Partially condensing the gas received from the asymmetric bi-conical chamber into the fluid form of the phase change material using the vector cancelling condenser fluidically coupled with the asymmetric bi-conical chamber, and recirculate a portion of the condensed fluid from the fluid container into the wall of the vector cancelling condenser to absorb the latent heat of the saturated vapours.

The condensed fluid extracts heat from the vector cancelling condenser to form additional high pressure vapours delivered to the high pressure cylinder to run the turbine.

g) Further condensing the un-condensed gas from the vector cancelling condenser into fluid form using the condensation chamber fluidically coupled with the vector cancelling condenser, and delivering the fluid to the energy collecting module.

In addition to the method of operating the solar turbine system, the present invention also includes a computer-readable medium containing instructions for controlling the solar turbine system. The instructions comprise receiving solar radiation energy and converting a phase change material into gas, storing the gas at high pressure, expanding the gas to generate electricity, cooling the gas, partially condensing the gas into fluid form, condensing un-condensed gas into fluid, and delivering the fluid to the energy collecting module.

The solar turbine system described in this patent specification provides an efficient and effective solution for converting solar radiation energy into electricity. The unique combination of components, including the energy collecting module, high-pressure cylinder, turbine, asymmetric bi-conical expansion chambers, vector cancelling condenser, and condensation chamber, allows for improved heat dissipation, condensation of the working fluid, and overall system efficiency. The system's control system, backup energy storage, and monitoring capabilities further enhance its functionality and performance.

The embodiments described above provide a solar turbine system and a method for efficiently converting solar radiation energy into electricity and enabling energy storage using phase change materials. The various components and features of the system work together to enhance performance and maximize energy conversion efficiency. The system is also equipped with control, monitoring, and backup energy storage capabilities to optimize operation and provide reliable power generation.

| LIST OF REFRENCE NUMERALS | |
|---|---|
| 100 | Solar turbine system |
| 110 | Energy collecting module |
| 112 | Transparent outer body |
| 114 | Transparent inner body |
| 116 | 3-dimensional metallic grid |
| 118 | Inlet pipe |
| 119 | Outlet pipe |
| 120 | High-pressure cylinder |
| 130 | Turbine |
| 140 | Asymmetric bi-conical expansion chamber |
| 150 | Vector cancelling condenser |
| 152 | Body |
| 154 | Delivery tube |
| 156 | Gas outlet |
| 158 | Fluid container |
| 160 | Condensation chamber |

The invention claimed is:

1. A solar turbine system comprising:

an energy collecting module configured to receive solar radiation energy and utilize that solar radiation energy to convert a fluid of a phase change material into gas, wherein the energy collecting module comprises:

a transparent outer body, a transparent inner body separated from the outer body by a vacuum, a 3-dimensional metallic grid placed inside the transparent inner body, an inlet pipe and an outlet pipe;

a high-pressure cylinder fluidically coupled with the energy collecting module, and the high-pressure cylinder is configured to store the gas at high pressure;

a turbine fluidically coupled with the high-pressure cylinder and the turbine is configured to generate electricity from the expansion of gas received from the high-pressure cylinder;

at least one asymmetric bi-conical expansion chamber fluidically coupled with the turbine and the asymmetric bi-conical expansion chamber is configured to cool the gas received from the turbine;

a vector cancelling condenser fluidically coupled with one asymmetric biconical chamber and the vector cancelling condenser is configured to partially condense the gas received from the asymmetric biconical chamber into fluid form of the phase change material and deliver the fluid to the energy collecting module, wherein the vector cancelling condenser comprises:

a body defined by at least one wall and an enclosed space, at least one pair of delivery tubes having a pair of gas outlets in the body, wherein the pair of gas outlets are facing each other and configured to cancel the velocity of gas coming out from the gas outlets to form saturated vapor of the gas, and condensed fluid is formed by releasing latent heat of condensation from the saturated vapors, and a fluid container fluidically coupled with the body, condensation chamber and the high pressure cylinder, the fluid container configured to store the condensed fluid and recirculate a portion of the condensed fluid into the wall of the vector cancelling condenser to absorb the latent heat of the saturated vapours; and a condensation chamber fluidically coupled with the vector cancelling condenser, the fluid container and the condensation chamber is configured to receive un-condensed gas from the vector cancelling condenser and condense the un-condensed gas to fluid and deliver the fluid to the energy collecting module and to the fluid container;

wherein the condensed fluid extracts heat from the vector cancelling condenser to form additional high pressure vapours delivered to the high pressure cylinder to run the turbine.

2. The solar turbine system as claimed in claim 1, wherein the fluid container is thermally insulated to reduce heat loss from the stored condensed fluid.

3. The solar turbine system as claimed in claim 1, further comprising a control system configured to regulate the flow of the phase change material and the gas within the system based on temperature, pressure, and electricity generation requirements.

4. The solar turbine system as claimed in claim 1, wherein the phase change material is selected from the group consisting of nitrogen, paraffin wax, fatty acids, and salts.

5. The solar turbine system as claimed in claim 1, wherein the turbine is coupled to a generator for converting mechanical energy into electrical energy.

6. The solar turbine system as claimed in claim 1, wherein the asymmetric bi-conical expansion chamber comprises cooling fins or heat sinks to enhance heat dissipation from the gas.

7. The solar turbine system as claimed in claim 1, further comprising a monitoring system for collecting and analyzing performance data of the system.

8. The solar turbine system as claimed in claim 1, further comprising a backup energy storage system to store excess electricity generated by the turbine for use during periods of low solar radiation.

9. The solar turbine system as claimed in claim 1, wherein the inlet pipe further comprises a flow control valve to regulate the flow of the fluidized phase change material to the transparent inner body.

10. A method for operating a solar turbine system comprising:

a) receiving solar radiation energy using an energy collecting module;

b) converting a fluid of a phase change material into gas using the solar radiation energy received in step (a);

c) storing the gas at high pressure in a high-pressure cylinder fluidically coupled with the energy collecting module;

d) generating electricity by expanding the gas received from the high-pressure cylinder in a turbine;

e) cooling the gas received from the turbine using at least one asymmetric bi-conical expansion chamber fluidically coupled with the turbine;

f) partially condensing the gas received from the asymmetric bi-conical chamber into the fluid form of the phase change material using a vector cancelling condenser fluidically coupled with the asymmetric bi-conical chamber, and recirculate a portion of the condensed fluid from the fluid container into the wall of the vector cancelling condenser to absorb the latent heat of the saturated vapours, wherein the condensed fluid extracts heat from the vector cancelling condenser to form additional high pressure vapours delivered to the high pressure cylinder to run the turbine;

g) further condensing the un-condensed gas from the vector cancelling condenser into fluid form using a condensation chamber fluidically coupled with the vector cancelling condenser, and delivering the fluid to the energy collecting module and to the fluid container.

11. The method as claimed in claim 10, wherein the step of cooling the gas received from the turbine in the asymmetric bi-conical expansion chamber comprises utilizing the expansion of the gas to reduce the gas temperature.

* * * * *